United States Patent
Henry, Jr.

(10) Patent No.: US 6,832,075 B1
(45) Date of Patent: Dec. 14, 2004

(54) METHOD FOR CALIBRATING THE POWER OUTPUT OF A MOBILE DEVICE

(75) Inventor: Raymond C. Henry, Jr., Wake Forest, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/412,905

(22) Filed: Oct. 5, 1999

(51) Int. Cl.$^7$ .............................................. H04B 17/00
(52) U.S. Cl. ...................... 455/67.4; 455/69; 455/226.1
(58) Field of Search ........................ 455/67.4, 91, 422, 455/423, 69, 73, 226.1, 226.4, 126

(56) References Cited

U.S. PATENT DOCUMENTS

| | | | |
|---|---|---|---|
| 4,776,032 A | * | 10/1988 | Odate et al. ................... 455/24 |
| 4,901,368 A | * | 2/1990 | Arnold et al. .............. 455/12.1 |
| 5,381,108 A | * | 1/1995 | Whitmarsh et al. ......... 330/107 |
| 5,835,850 A | * | 11/1998 | Kumar ...................... 455/67.4 |
| 5,881,376 A | | 3/1999 | Lundberg et al. |
| 5,890,057 A | | 3/1999 | Dutkiewicz et al. |
| 5,995,541 A | * | 11/1999 | Navid et al. ................. 375/224 |
| 6,101,399 A | * | 8/2000 | Raleigh et al. ............. 455/561 |
| 6,118,811 A | * | 9/2000 | Narumi et al. ................ 455/84 |
| 6,370,364 B1 | * | 4/2002 | Liimatainen ................ 455/126 |

* cited by examiner

Primary Examiner—Tony T. Nguyen
(74) Attorney, Agent, or Firm—Coats & Bennett, P.L.L.C.

(57) ABSTRACT

A loopback module includes a plurality of signal paths and is designed to mix an incoming phone signal with a signal from a signal generator to produce a loopback signal at the receive frequency of the phone. The loopback signal is applied to the phone's antenna. The phone then evaluates the loopback signal to determine the appropriate offset for the transmitter chain at that frequency and power level. This process is iterated until the desired number of frequencies and power levels are tested for proper calibration. The offsets are stored in memory for later use by the phone.

25 Claims, 8 Drawing Sheets

METHOD FOR CALIBRATING THE POWER OUTPUT OF A MOBILE DEVICE

FIELD OF THE INVENTION

This invention pertains to a device and method for calibrating the power output of a mobile communications device.

BACKGROUND OF THE INVENTION

In a mobile communication system, the transmit power of the mobile station is controlled to meet two sometimes competing objectives. The first objective is to maintain minimum signal quality standards. If the signal is fading, the mobile station will increase its transmit power so that the received signal at the base station meets the minimum signal quality standard. The second objective is to reduce adjacent channel and co-channel interference so that other devices also using that particular base station may communicate clearly. If the transmit power of a particular device is too high, some of the power may spill into neighboring channels causing interference with transmission from other mobile stations. Therefore, the mobile station will, whenever possible, reduce its transmit power to avoid interference provided that the minimum signal quality standard can be maintained at the 1000 level.

To effectively control the power level of the mobile station, it is desirable that the power amplifier of the mobile terminal have a linear performance over both frequency and the dynamic range of the power levels required. Unfortunately, mobile devices are the sum of several electronic components, none of which necessarily behaves linearly. Therefore, a typical mobile device will have a non-linear curve when comparing an expected power output to actual power output as seen in FIG. 1. This curve changes at each of the operating frequencies of the mobile device. To compensate for this nonlinearity, the mobile device incorporates a set of offsets (see FIG. 1) and stores them in non-volatile memory. These offsets are designed to bring the actual power output into a linear relation with the expected output. For example, where the actual power output exceeds the expected power output, a negative offset is stored to reduce the actual power output (the circled portion of FIG. 1).

In order to calculate these offsets, manufacturers typically measure the output power level at many points across both the frequency band and the dynamic power range of the transmitter. The higher the number of points, the better the accuracy (and linearity) of the resulting output signal. Where Time Division Multiplexing Access (TDMA) is used, the number of power levels is restricted, and thus the total number of points is relatively reasonable. However, where Channel Division Multiplexing Access (CDMA) is used, an infinite number of power levels may be used theoretically, resulting in effectively infinite number of points to be tested.

Complicating the problem, while the circuits used in different devices of the same product line are theoretically the same, individual variation within the parts used to create the circuits in the different devices have individual variations, which results in the offsets being unique to each device. Thus, each device must be tested individually to ensure proper calibration of the device.

Conventionally, this calibration is done with an expensive rack of equipment including an antenna connected to a receiver and transmitter, several power supply sources, and a processor (typically in a personal computer) to control the rack and communicate with the processor in the mobile device. Initially, the receiver of the mobile device is calibrated by generating a signal at a set frequency and power level and applying it to the mobile device's antenna. The rack processor evaluates the readings within the mobile device processor and calculates an offset, which is then stored by the mobile device. This process is repeated for a number of points at different frequencies and power levels. This is not a fast process because the test equipment must "settle" at each frequency.

After calibration of the receiver chain, the transmitter chain is calibrated. This involves the mobile device transmitting at a number of frequencies and power levels to the antenna of the test equipment. The device communicates with the rack processor and tells the rack processor that it transmitted on x frequency at y power. The rack processor then compares this information to the frequency and power that was received at the test equipment. Again, the test equipment takes time to settle at each operative frequency and power level tested. From the comparison, the rack processor can calculate an offset, which is sent, typically by a serial communication line to the mobile device, which then stores the offset in its memory.

This calibration process can be time consuming and costly by adding test time in the factory and demanding expensive testing equipment. Given the intense competition to produce an economical mobile device, any increase in the production cost is undesirable. Thus, manufacturers try to reduce time by speeding up the measurement capability and/or the communication between the test equipment and the mobile device so that the testing is accomplished faster; or the manufacturers cut corners and test fewer points across the bandwidth and the dynamic range of the transmitter. Alternatively, the parts used to assemble the device may be made to a more exacting standard such that the devices within the product line behave identically or the parts themselves behave more linearly, so that fewer non-linear instances occur. All of these solutions have shortcomings. The first solution typically involves creating more expensive test equipment, the cost of which is then passed on to the cost of the device. The second solution increases the errors that may occur during the use of the device, especially where improper offsets are stored in the memory and the end result is poorer performance of the device. The final solution also results in a more expensive device because the cost of the more precise parts is higher.

Accordingly, there remains a need in the field of mobile communications device testing, and particularly in the field of mobile phone testing, to provide an economical method and device which reduces the time necessary to test and calibrate a mobile phone without adding substantially to the cost of the test equipment.

SUMMARY OF THE INVENTION

The present invention is a loopback module used for calibrating the receiver and transmitter chains of a mobile telephone. The loopback module is controlled by the mobile telephone during the calibration procedure. The phone transmits a signal from the phone antenna to the loopback module. The loopback module changes the frequency of the transmitted signal to create a loopback signal, which is then fed back to the phone through the antenna. Software in the phone evaluates the loopback signal to determine the appropriate offset for the transmitter chain at that frequency and power level. This process is iterated until the desired number of frequencies and power levels are tested for proper calibration. The offsets are stored in memory for later use by the phone.

An alternate use of the loopback module is a general integrity check for the phone components. A signal is generated in the phone, sent to the loopback module, and a loopback signal is received by the phone from the loopback module. If the loopback signal fits within a window of acceptable responses, then the phone is considered to be O.K. to calibrate. If the phone is outside the window of acceptable responses, then the phone is slated for further testing to determine the component which is causing the poor response. Upon location and replacement of the defective component(s), the phone is tested again until an acceptable response is acquired, at which time the phone is calibrated.

DETAILED DESCRIPTION OF THE PREFERRED EMBODIMENT

Figure 1:
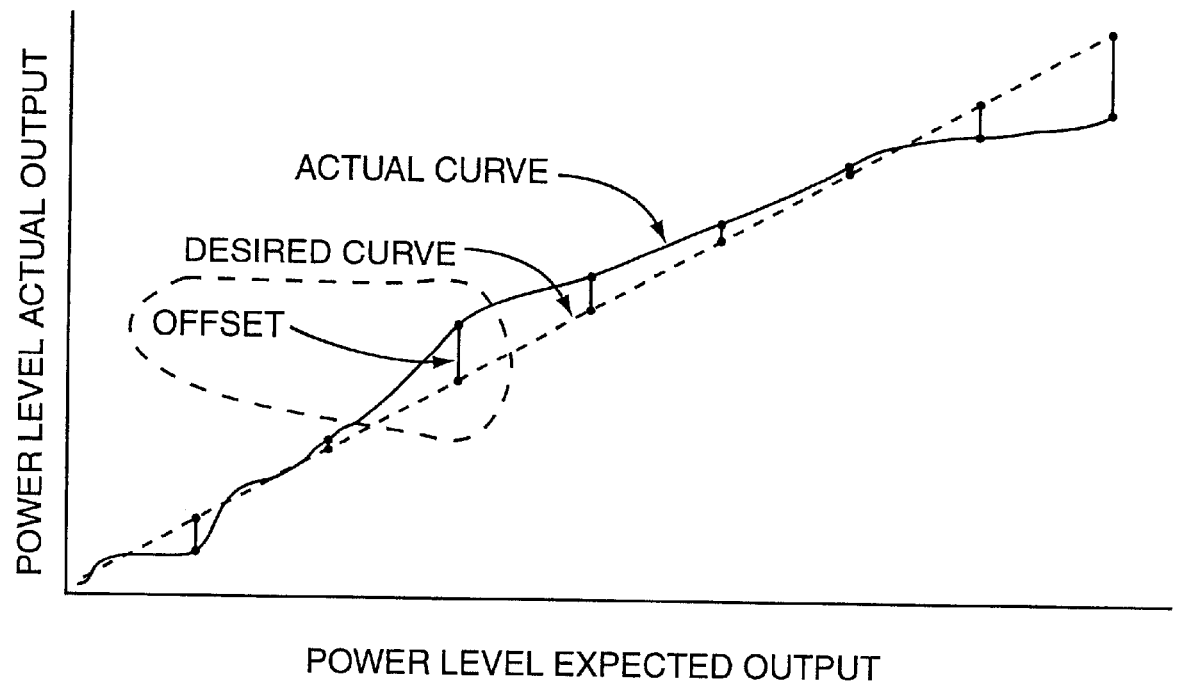
FIG. 1 shows a graph of the desired power levels of the mobile communications device compared to the actual power levels, illustrating the nature of the offsets used to calibrate devices.
Figure 2:
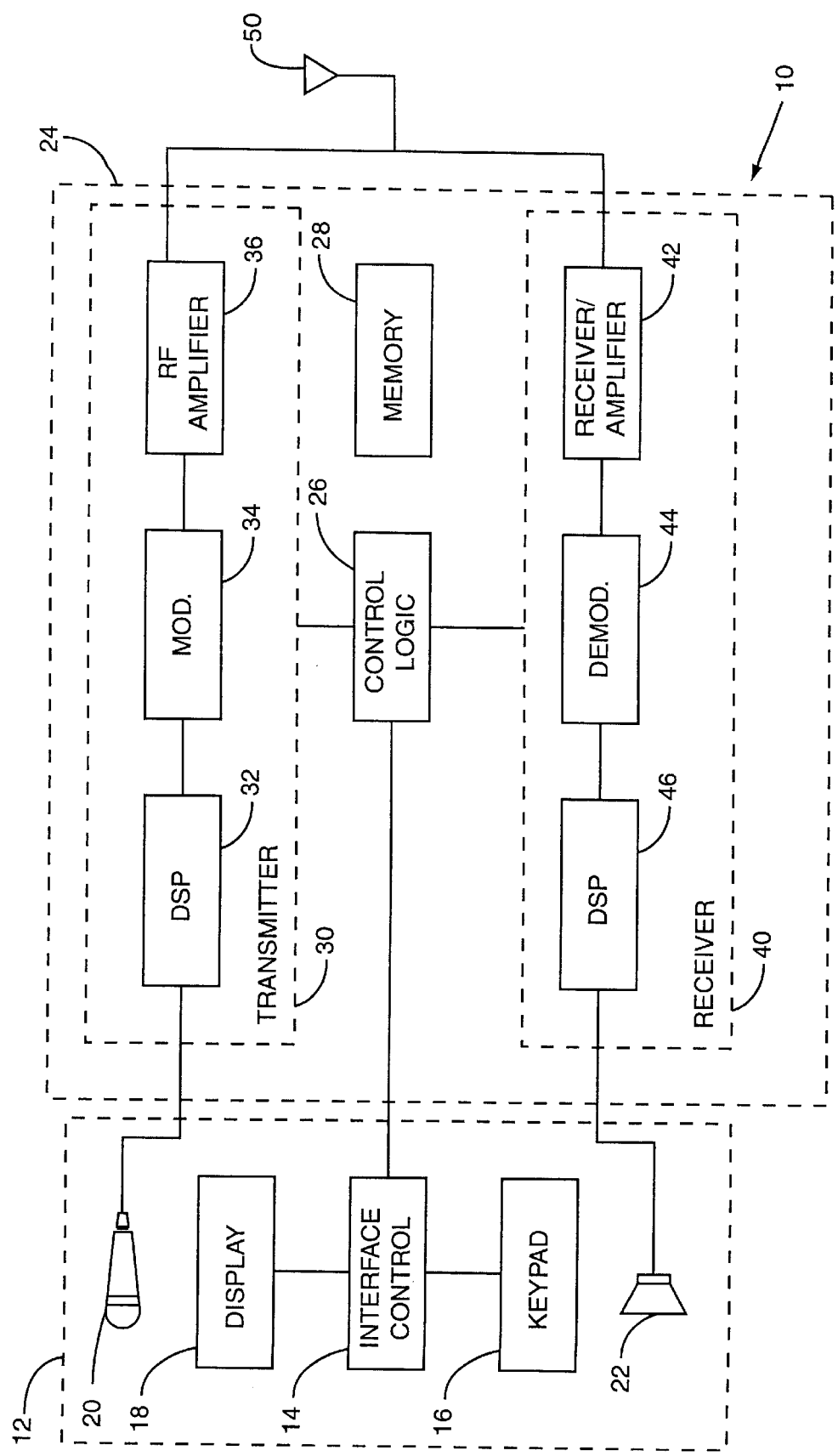
FIG. 2 is a schematic diagram of a cellular phone of the present invention.

Referring now to the drawings, and particularly to FIG. 2, a mobile communication device, such as a cellular telephone, is shown and indicated generally by the numeral 10. Mobile telephone 10 is a fully functional radio transceiver capable of transmitting and receiving digital and/or analog signals over an RF channel according to known standards, such as Telecommunications Industry Association (TIA), IS-54, IS-136, and IS-95. The present invention, however, is not limited to cellular telephones, but may also be implemented in other types of mobile communication devices including, without limitation, pagers and personal digital assistants.

The mobile telephone 10 includes an operator interface 12 and a transceiver unit 24 contained in a housing. Users can dial and receive status information from the mobile telephone 10 via the operator interface 12. The operator interface 12 consists of a keypad 16, display 18, microphone 20, and speaker 22. The keypad 16 allows the user to dial numbers, enter data, respond to prompts, and otherwise control the operation of the mobile telephone 10. The display 18 allows the operator to see dialed digits, call status information, messages, and other stored information. An interface control 14 interfaces the keypad 16 and display 18 with the telephone's control logic 26. The microphone 20 and speaker 22 provide an audio interface that allows users to talk and listen on their mobile telephone 10. Microphone 20 converts the user's speech and other sounds into audio signals for subsequent transmission by the mobile telephone 10. Speaker 22 converts audio signals received by the mobile telephone 10 into audible sounds that can be heard by the user. In general, the microphone 20 and speaker 22 are contained in the housing of the mobile telephone 10. However, the microphone 20 and speaker 22 can also be located in a headset that can be worn by the user.

The transceiver unit 24 comprises a transmitter 30, receiver 40, and antenna assembly 50. The transceiver circuitry or radio communications circuit is typically contained on a printed circuit board (not shown). The transmitter 30 includes a digital signal processor 32, modulator 34, and RF amplifier 36. The digital signal processor 32 converts analog signals from the microphone 20 into digital signals, compresses the digital signal, and inserts error-detection, error-correction, and signaling information. Modulator 34 converts the signal to a form that is suitable for transmission on an RF carrier. The RF amplifier 36 amplifies the signal to a suitable power level for transmission. In general, the transmit power of the telephone 10 can be adjusted up and down in two decibel increments in response to commands it receives from its serving base station. This allows the mobile telephone 10 to only transmit at the necessary power level to be received and reduces interference to nearby units. It is precisely this power level adjustment ability that is calibrated by the first aspect of the present invention.

The receiver 40 includes a receiver/amplifier 42, demodulator 44, and digital signal processor 46. The receiver/amplifier 42 contains a band pass filter, low level RF amplifier, and mixer. Received signals are filtered to eliminate side bands. The remaining signals are passed to a low-level RF amplifier and routed to an RF mixer assembly. The mixer converts the frequency to a lower frequency that is either amplified or directly provided to the demodulator 44. The demodulator 44 extracts the transmitted bit sequence from the received signal. The digital signal processor 46 decodes the signal, corrects channel-induced distortion, and performs error-detection and correction. The digital signal processor 46 also separates control and signaling data from speech data. The control and signaling data are passed to the control logic 26. Speech data is processed by a speech decoder and converted into an analog signal which is applied to speaker 22 to generate audible signals that can be heard by the user.

The control logic 26 controls the operation of the telephone 10 according to instructions stored in a program memory 28. Control logic 26 may be implemented by one or more microprocessors. The functions performed by the control logic 26 include power control, channel selection, timing, as well as a host of other functions. The control logic 26 inserts signaling messages into the transmitted signals and extracts signaling messages from the received signals. Control logic 26 responds to any base station commands contained in the signaling messages and implements those commands. When the user enters commands via the keypad 16, the commands are transferred to the control logic 26 for action.

The antenna 50 is operatively connected by a conventional transmission line to the transmitter 30 and receiver 40 for radiating and receiving electromagnetic waves. Electrical signals from the transmitter 30 are applied to the antenna 50 which converts the signal into electromagnetic waves that radiate out from the antenna 50. Conversely, when the antenna 50 is subjected to electromagnetic waves radiating through space, the electromagnetic waves are converted by the antenna 50 into an electrical signal that is applied to the receiver 40.

Figure 3:
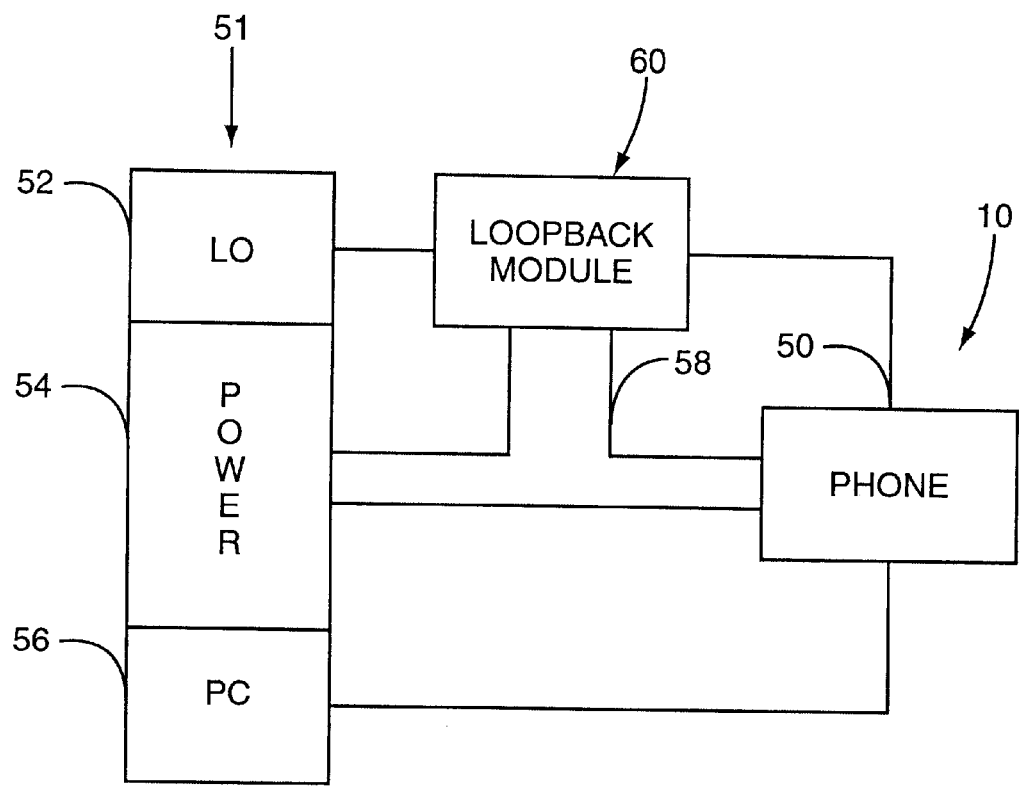
FIG. 3 is a block diagram of the calibration system of the present invention.

Turning now to FIG. 3, a simple block diagram of the calibration system of the present invention is shown The mobile phone 10 is operatively connected to an equipment rack 51 and to a loopback module 60. The loopback module 60 is operatively connected to the equipment rack 51. The equipment rack 51 includes a signal generator 52, such as the HP8924 sold by Hewlett Packard at 11311 Chinden Blvd, Boise Idaho 83714, a power source 54, and a processor 56 such as a personal computer (PC).

The power source 54 supplies power to the loopback module 60 and the phone 10 as well as to the elements of the equipment rack 51. The signal generator 52 communicates with the loopback module 60. The processor 56 is operatively connected to the phone 10 through a conventional serial connection. The phone 10 is connected by its antenna 50 to the loopback module 60 and by a serial connection 58 to a series of switches within the loopback module 60 as will be explained in greater detail below.

Figure 4:
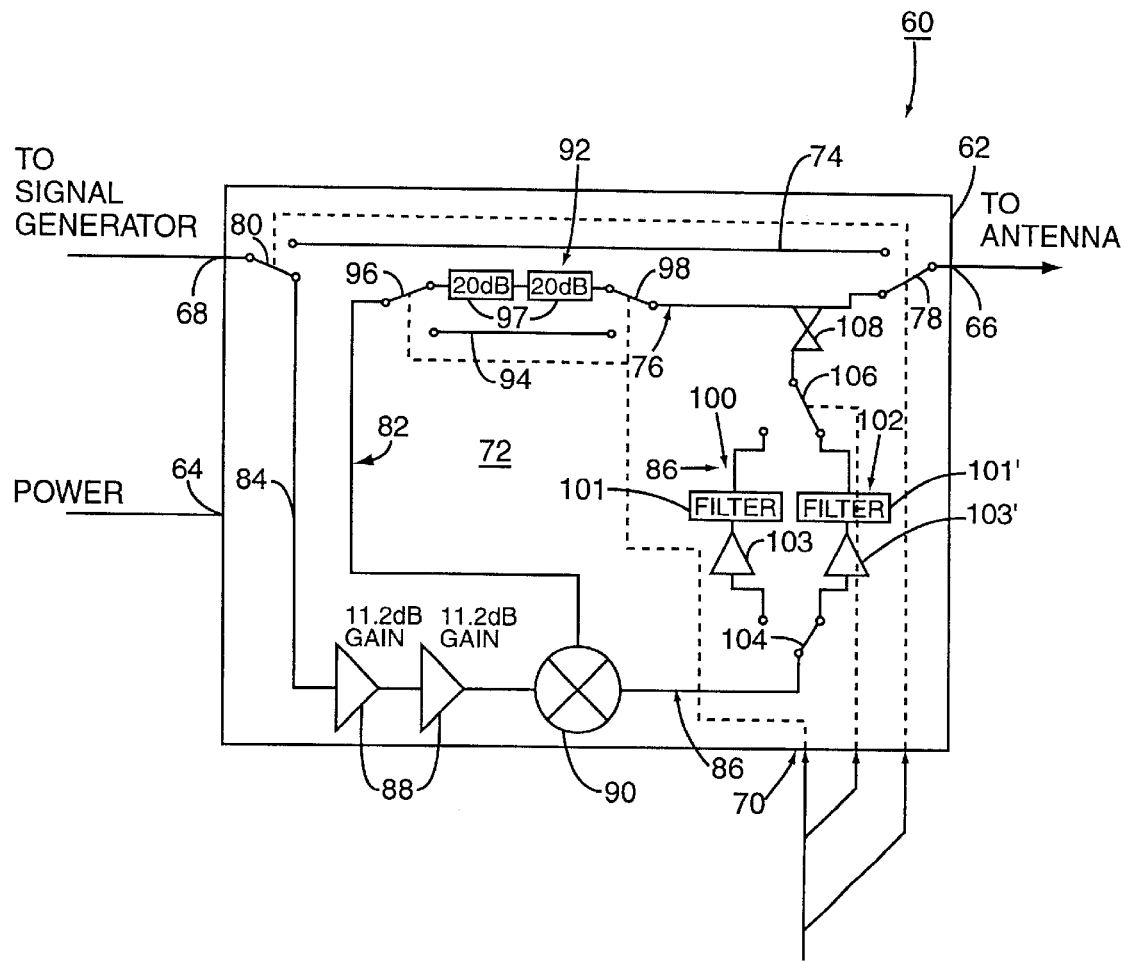
FIG. 4 is a detailed schematic diagram of the loopback module of the present invention.

The loopback module 60, best seen in FIG. 4, includes a housing 62 with a power port 64, an antenna port 66 operatively connected to the antenna 50 of the mobile phone 10, a signal generator port 68 operatively connected to the signal generator 52, and a switch control port 70 operatively connected to the phone 10. Within the housing 62 is a loopback circuit 72 which mixes transmitted RF signals from the mobile phone 10 and generates a loopback signal receive frequency of the mobile phone 10 for use in calibrating the phone's transmitter 30. The loopback circuit 72 also includes a direct signal path 74 for connecting the signal generator 52 and phone 10 to calibrate the phone's receiver 40.

The loopback circuit 72 includes a first signal path 74 directly connecting antenna port 66 and signal generator port 68, a second signal path 76 connecting the antenna port 66 to a first input of a mixer 90, a third signal path 84 connecting the signal generator port 68 to a second input of the mixer 90, and a fourth signal path 86 connecting the output of the mixer 90 to the antenna port 66.

The first signal path 74, called the direct signal path herein, is used to transmit signals from port 68 to port 66 for calibrating the receiver 40. The second signal path 76, called the transmit signal path, transmits signals applied at port 66 by the mobile phone 10 to the mixer 90. The transmit signal path 76 includes first and second branches 92 and 94. First branch 92 provides a direct, non-attenuating path from port 66 to the mixer 90. Second branch 94 includes a pair of 20 dB attenuators 97 to attenuate the transmitted signal. This is necessary at higher power levels. A pair of switches 96 and 98 select between the first and second branches 92 and 94.

The third signal path 84, called the mixing signal path, transmits injection signals applied at port 68 by the signal generator 52 to the mixer 90. These injection signals are mixed with the transmitted signal to generate a loopback signal at the receive frequency of the mobile phone 10. The mixing signal path 84 includes a pair of amplifiers 88 to amplify the injection signal.

The fourth signal path 86 referred to as the loopback signal path, transmits the loopback signal output by the mixer 90 to port 66. Loopback signal path 86 includes first and second branches, 100 and 102 respectively. Each branch 100, 102 of the loopback signal path 86 includes an amplifier 103, 103' and a filter 101, 101' respectively corresponding to two different frequency bands. Loopback signal path 86 is coupled to antenna port 66 by a coupler 108. Alternatively, loopback signal path 86 could connect to a separate output port (not shown) instead of antenna port 66.

In use, the loopback module 60 helps calibrate the phone 10 using primarily the processor or control logic 26 of the phone 10 to complete the calibration process. The offsets created by this calibration are stored in the memory 28 of the phone 10 and the phone 10 is ready to ship. In particular, the memory 28 of the phone 10 may have software preprogrammed into the phone 10, or the PC 56 could upload the program at the start of the calibration process. While the control logic 26 is expected to perform all of the calculations detailed below, it is possible to supplement the control logic 26 with the computing power of the PC 56 if needed or desired. It is believed however, that most communication between the PC 56 and the control logic 26 may be eliminated, thereby reducing the calibration time required.

Figure 5:
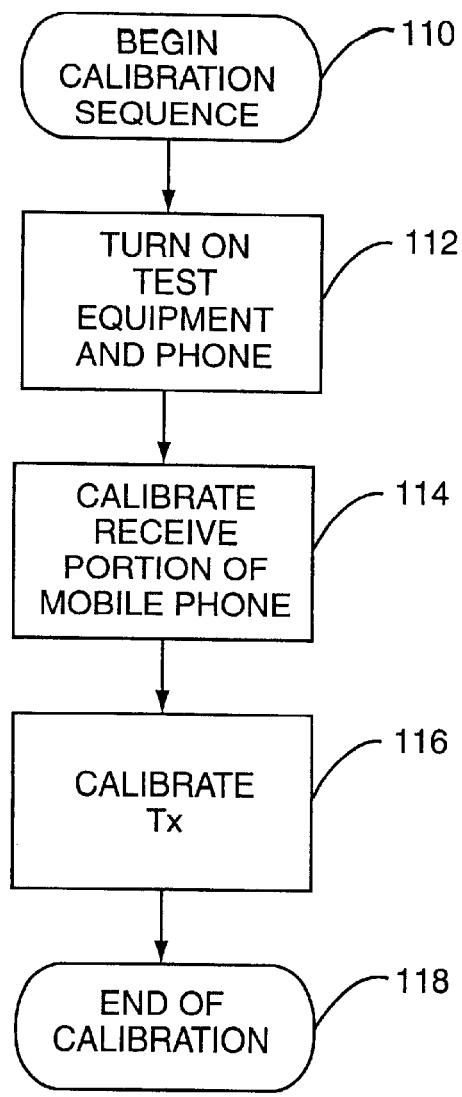
FIG. 5 is a simplified flow diagram illustrating the calibration process of the present invention.

FIG. 5 shows an overview of the preferred method of calibrating the phone 10. It is to be understood that the aforementioned software within the memory 28 of the phone 10 preferably implements this method. The calibration sequence begins at block 110. The phone 10, the equipment rack 51, and the loopback module 60 are turned on (block 112). The PC 56 instructs the phone 10 to begin calibration of the receiver portion 40 of the phone 10 (block 114). After the receiver 40 is calibrated, the transmitter 30 of the phone is then calibrated (block 116) and the calibration procedure ends (block 118).

Figure 6:
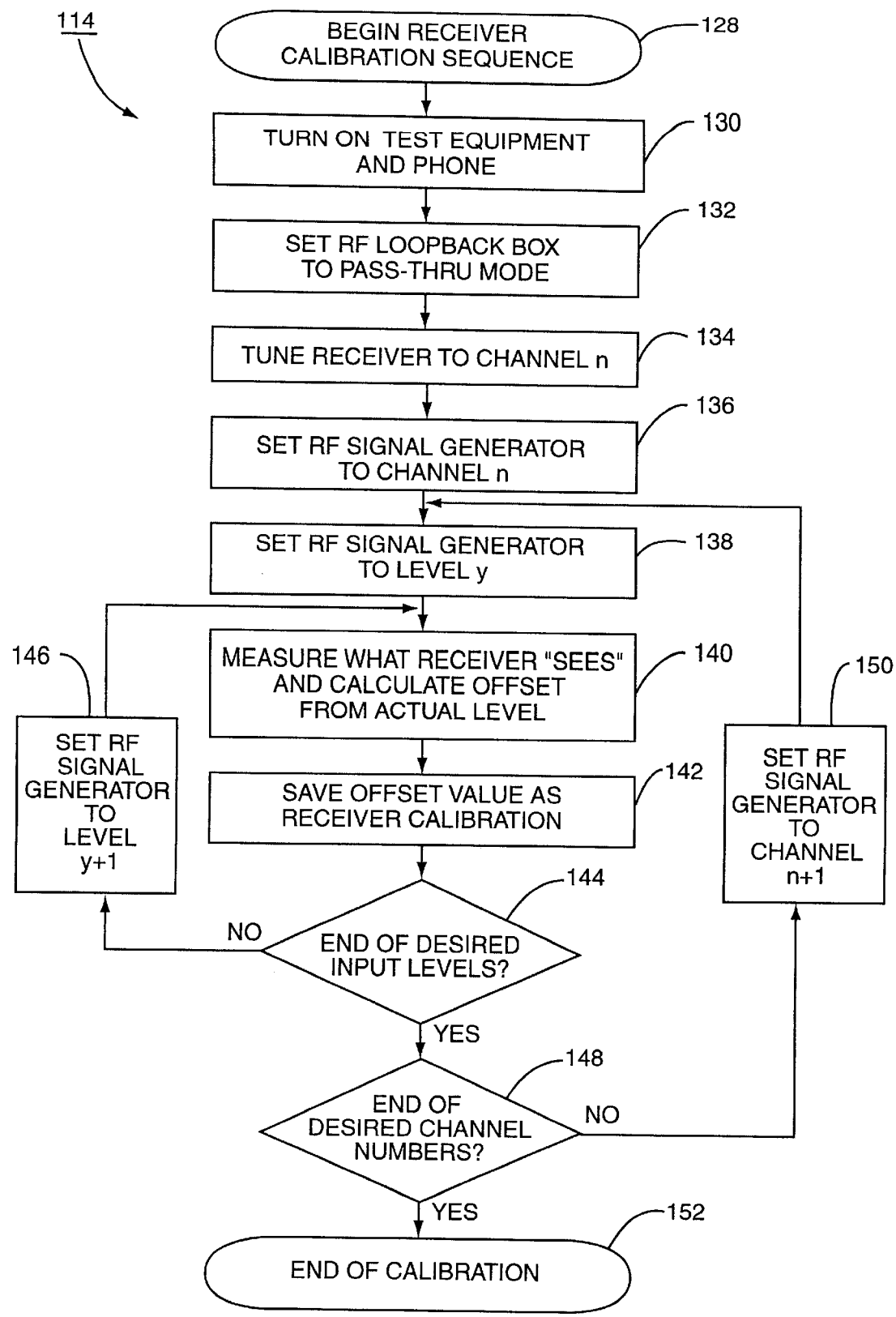
FIG. 6 is a detailed flow diagram of the receiver calibration process of the present invention.

The calibration of the receiver portion 40 is shown in FIG. 6, where block 114 is exploded into its component steps. Specifically, the calibration of the receiver portion 40 begins at block 128. If not already turned on in block 112, the phone 10 and the test equipment, including the loopback module 60, is turned on (block 130). The phone 10 sets the loopback module 60 to pass-thru mode (block 132) by manipulating switches 78, 80 to direct signals along the first signal path 74. The receiver 40 is tuned to a first channel n (block 134). The signal generator 52 is then set to the same channel n (block 136). This tuning is accomplished by the phone 10 communicating with the PC 56, which then instructs the signal generator 52 to tune to the correct channel.

The signal generator 52 is then set to a power level y (block 138). Again, this is accomplished from the phone 10 to the PC 56 to the generator 52. The signal from the signal generator 52 enters the loopback module 60 at the signal generator port 68, passes along the direct signal path 74, and is applied to the antenna 50 of the phone 10 via the antenna port 66. The phone 10 measures the power level of the received signal and calculates an offset value based on the actual level of the signal (block 140). The offset is then saved in memory 28 (block 142). The phone 10 knows the actual level of the signal generated through the link with the PC 56.

The phone 10 then checks to see if this offset is the end of the desired power levels for this channel (block 144). If the answer is no, then the signal generator increments the power level (block 146) and steps 140 and 142 are repeated. When the power levels at that particular channel have been exhausted, i.e. the answer to block 144 is yes, then the phone 10 checks to see if this is the last channel to be tested (block 148). If the answer is no, then the signal generator 52 increments the channel (block 150) and repeats steps 138, 140, 142, 144 and 146 as described above until the channels have been exhausted. When the channels have been exhausted, i.e. the answer to block 148 is yes, then the receiver calibration ends (block 152).

Figure 7:
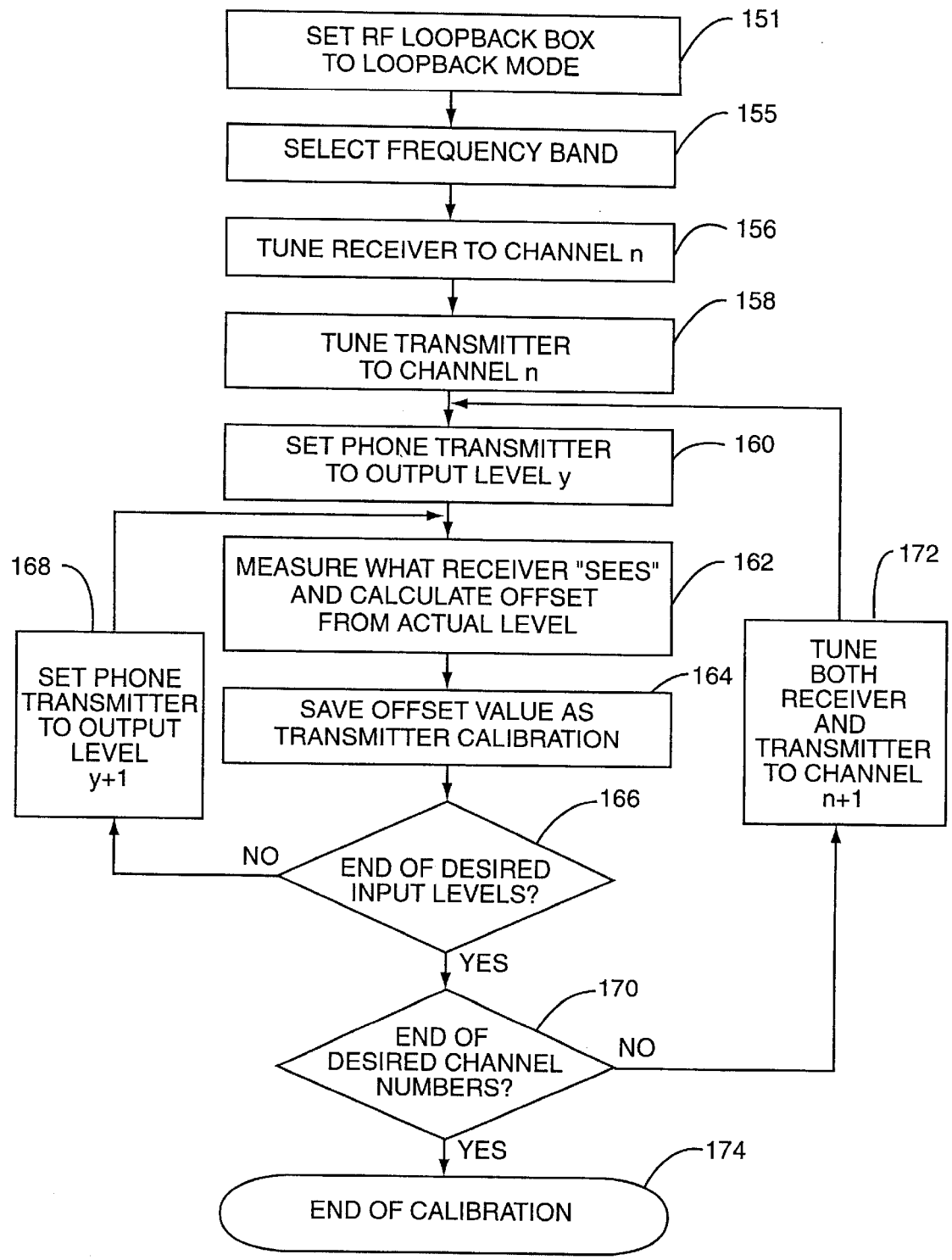
FIG. 7 is a detailed flow diagram of the transmitter calibration process of the present invention.

The calibration of the transmitter portion 30 is shown in FIG. 7, where block 116 is exploded into its component steps. Initially, the loopback module 60 is set to loopback mode (block 154). This is effectuated by instructing switches 78 and 80 to select the second signal path 76. This causes the injection signal from the signal generator 52 to enter the signal generator port 68 and pass through the two amplifiers 88 to the mixer 90.

The signal generator 52 is tuned to the difference between the transmit frequency and the receive frequency for a given channel. For example, if the phone were operating in a 800 MHz mode, the transmit frequency range is between 824.040–848.970 MHz and the receive frequency range is between 869.040–893.970 MHz. Thus, the signal generator 52 would be tuned to 45 MHz, representing the difference between the transmit frequency and the receive frequency for a given channel n. Likewise, in the 1900 MHz mode, the signal generator 52 would be tuned to 80 MHz because the transmit frequency range is 1850–1910 MHz and the receive frequency is 1930–1990 MHz.

Because more phones are now operating in at least two modes representing different frequency bands, the loopback module 60 should also be equipped to handle these multiple modes. As a result, the loopback signal path 86 includes the first frequency branch 100 and the second frequency branch 102 controlled by switches 104, 106. The phone 10 knows which frequency band is being tested and selects the appropriate frequency branch 100, 102 accordingly (block 155). In the disclosed loopback module 60, the amplifier and filter combination 101, 103 in the first branch 100 operate at the 800 MHz band and exclude any transients and harmonics which may interfere with the calibration process. Likewise, the amplifier and filter combination 101', 103' in the second branch 102 operate at the 1900 MHz band and similarly exclude transients and harmonics outside the desired frequency range.

The receiver 40 of the phone is tuned to channel n (block 156) and the transmitter is tuned to channel n as well (block 158). The transmitter 30 is set to an output power level y (block 160) and transmits. The transmitted signal is applied at the antenna port 66 of the loopback module 60 and directed through either non-attenuated branch 94 or attenuated branch 92. If the power level y is relatively high, such that the mixer 90 or other electrical components within the circuit 72 might be damaged, the phone 10 actuates switches 96 and 98 to select the attenuated branch 92, which results in a 40 dB reduction in the strength of the phone signal before it arrives at the mixer 90. If the power level y is relatively low, then the phone signal is routed through the non-attenuated branch 94 by switches 96 and 98. The phone controls the operation of all the switches through the control port 70.

The transmitted phone signal is then mixed in the mixer 90 with the signal from the signal generator 52 to create a loopback signal at the receive frequency of the selected channel n. This loopback signal then exits the mixer 90 by loopback signal path 86, where it travels through the selected frequency path 100 or 102 as determined by the position of the switches 104 and 106. The loopback signal is amplified and filtered by the appropriate elements and passed to the coupler 108, which couples the loopback signal to the antenna port 66, which now serves as both an output port and an input port. It should be understood that the loopback signal need not be coupled back through the first port 66, rather the loopback signal could also exit through a dedicated output port.

The antenna 50 now receives the loopback signal. The phone 10 measures the power of the received signal and calculates an offset from the value observed versus the value the phone thought it transmitted (block 162). The phone 10 compensates for any attenuation due to the path taken by the signal. The offset is saved (block 164) and the phone checks to see if this is end of the desired input levels (block 166). If the answer is no, then the power level is incremented (block 168) and steps 162, 164, and 166 are repeated. When the power level increments above a certain "safe" level, the phone 10 switches the loopback module to the attenuated path 92 so that no components are inadvertently damaged during the testing at the higher power levels. If the answer to block 166 is yes, channel n has been tested at all the desired power level test points, then the phone 10 asks if all the channels have been tested (block 170). If the answer to block 170 is no, then both the receiver 40 and the transmitter 30 increment to the next channel (block 172) and steps 162, 164, 166, and 168 are repeated until a yes is returned from block 170. If a yes is returned from block 170, then the calibration of the transmitter 30 ends (block 174), and the calibration of the phone 10 for that frequency band ends (block 126, FIG. 5).

The phone 10 may then be calibrated for a different frequency band if so desired with the appropriate shift of switches 104, 106. While the present invention does require greater care in calibrating the receiver 40 of the phone 10, great savings are made in the time required calibrating the transmitter 30. This is due in large part to the fact that the test elements do not have to settle between tuning changes, nor is time wasted communicating back and forth between the phone 10 and the PC 56 during the transmitter calibration. As noted above, it is possible to supplement the computing power of control logic 26 with the PC 56, but such is not preferred.

Figure 8:
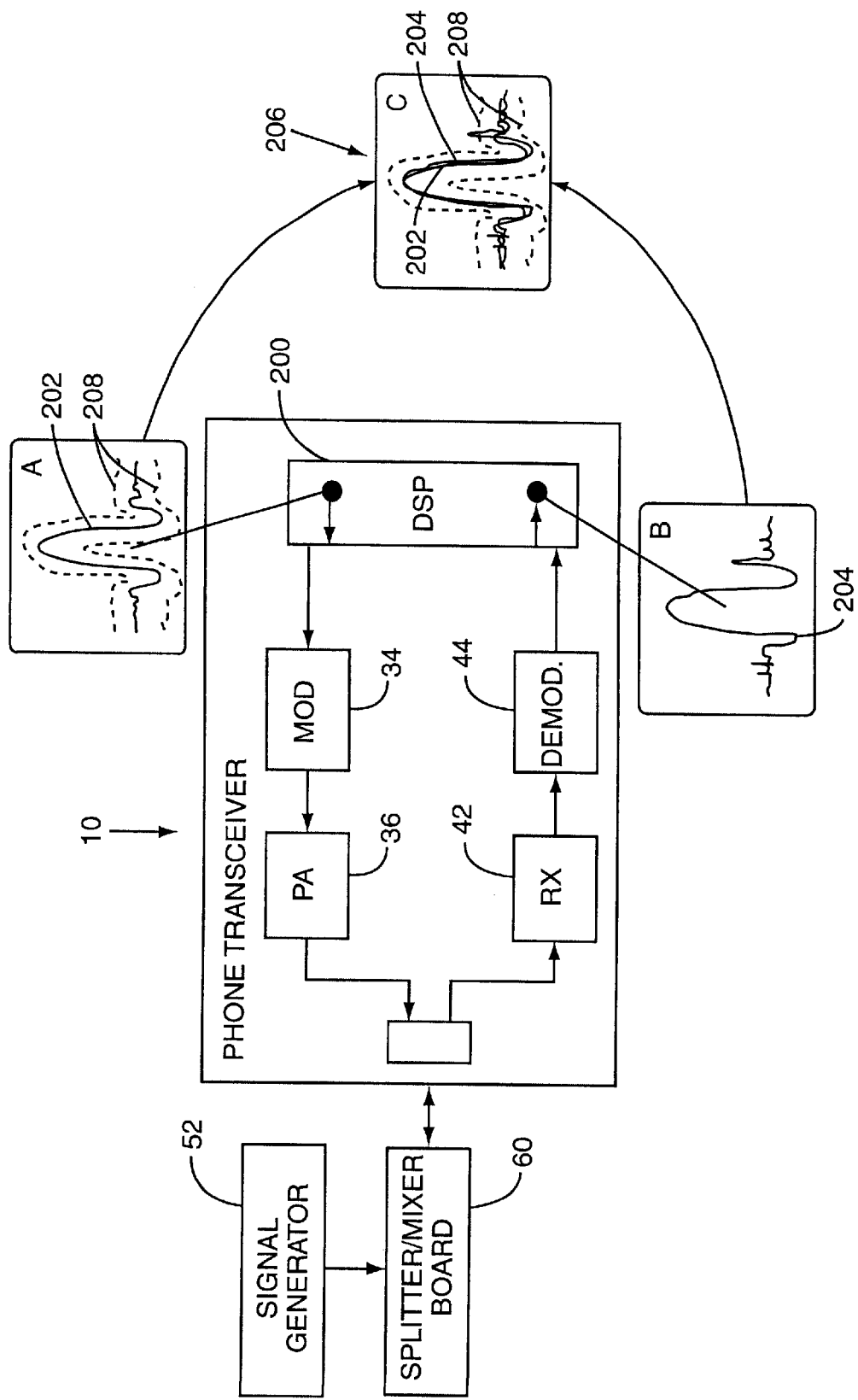
FIG. 8 is a schematic diagram of an alternate use of the present invention.

Another aspect of the present invention is seen in FIG. 8. The present invention may also be used to simply test phones or to test individual components within the phones. The phone 10 is connected to the loopback module 60, which in turn is connected to the signal generator 52. A digital signal processor 200, which may be part of the control logic 26, or may be part of either the transmitter 30 or receiver 40, generates a baseband signal 202. The signal 202 is preferably transformed into the frequency spectrum in the DSP 200. In the preferred embodiment, the DSP 200 performs a FFT on the signal 202. The signal 202 is then modulated by the transmitter 30 and sent through the loopback module 60. Preferably, the signal is at a relatively low power and need not be attenuated. The baseband signal is mixed to the receiver frequency in the mixer 90 as described above and the resulting loopback signal is sent back to the phone 10 after filtering. The receiver 40 receives the loopback signal and performs the demodulation.

Upon arrival at the DSP 200, the loopback signal is also transformed to generate frequency loopback signal 204. The loopback signal 204 is compared to the baseband signal 202 as generally seen at 206. It can be imagined that there is a band around the baseband signal 202, seen in dotted lines at 208, which forms an envelope. This envelope represents a "good" phone, i.e. any response falling within this envelope 208 means that the phone tested had an acceptable response. The envelope 208 may be derived from a number of known good phones prior to beginning this type of test.

This test uses the full transmit and receive paths, and any gross inherent problems would show up in the received waveform. The test could be used either as a stand alone go/no-go test, or as an initial screen to determine whether the phone should be sent for calibration.

Furthermore, by changing the baseband signal 202, individual elements within either the transmitter chain 30 or the receiver chain 40 may be excited and tested. This provides a great degree of flexibility in testing components without requiring additional expensive testing equipment other than the loopback module 60.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of calibrating the transmitter chain of a mobile communications device, said method comprising the steps of:
    a) transmitting a signal from the mobile communications device;
    b) converting the transmitted signal to a receivable loopback frequency in a loopback module external to the mobile communications device;
    c) receiving the loopback signal at the mobile communications device; and
    d) determining an appropriate offset to correct an error in the output power level for the transmitter chain at the mobile communications device based on the loopback signal.

2. The method of claim 1 wherein determining an offset value includes measuring a characteristic of the received loopback signal and calculating the difference between the measured value and an expected value of said characteristic to determine the offset.

3. The method of claim 1 wherein determining an offset comprises determining a power offset.

4. The method of claim 3 wherein determining a power offset comprises calculating the difference between the power of the loopback signal and the expected transmit power of the mobile communication device.

5. The method of claim 1 wherein converting the transmitted signal to a loopback signal includes mixing the transmitted signal with a generated signal to convert the transmitted signal to the receive frequency of the mobile communication device.

6. The method of claim 4 wherein converting the transmitted signal to a loopback signal includes attenuating the transmitted signal so that the power of the loopback signal falls within a predetermined range.

7. The method of claim 1 further comprising the step of calibrating the receiver chain of the mobile communications device prior to calibrating the transmitter chain.

8. The method of claim 1 further comprising the step of storing the offset in memory.

9. A mobile communications device including:
    a transmitter for transmitting a signal;
    a receiver for receiving a loopback signal derived from the transmitted signal at a loopback module external to the mobile communications device; and
    a processor operatively connected to said transmitter and said receiver for determining an offset based on said loopback signal.

10. The mobile communications device of claim 9 wherein determining an offset based on said loopback signal comprises the processor measuring a characteristic of the received loopback signal and calculating the difference between the measured value and an expected value of said characteristic to determine the offset.

11. A method of converting a signal from a mobile communications device to a loopback signal for calibrating the mobile communications device, said method comprising the steps of:
    receiving, at a loopback module external to the mobile communications device, a transmitted signal from the antenna of the mobile communications device;
    receiving an injection signal from a signal generator;
    mixing the transmitted signal with the injection signal to create a loopback signal; and
    applying the loopback signal to the antenna of the mobile communications device.

12. The method of claim 11 further comprising the step of generating said injection signal at a signal generator.

13. The method of claim 11 wherein receiving a transmitted signal comprises the step of receiving a transmitted signal at a first input port.

14. The method of claim 13 wherein transmitting the loopback signal comprises the step of transmitting the loopback signal at an output port.

15. The method of claim 13 further comprising the step of coupling the transmitted signal to the loopback signal such that the loopback signal may be transmitted from said first input port.

16. The method of claim 11 further comprising the step of attenuating the transmitted signal prior to mixing with the injection signal.

17. The method of claim 11 further comprising the step of filtering the loopback signal.

18. A calibration system comprising:
    a mobile communications device including an antenna for transmitting a transmitted signal;
    a signal generator for generating an injection signal; and
    a loopback module external to the mobile communications device operatively connected to said signal generator and said antenna, said loopback module including:
        a mixer to mix said transmitted and injected signals to produce a loopback signal for transmission to said antenna; and
    a processor for determining a desired offset based on said loopback signal, said processor operatively connected to said antenna.

19. The calibration system of claim 18 wherein said mobile communications device is a mobile phone.

20. The calibration system of claim 18 wherein said loopback module comprises an input port and an output port.

21. The calibration system of claim 18 wherein said injection signal is periodic.

22. A method of calibrating a mobile communications device, said method comprising the steps of:
    transmitting a signal from a mobile communications device;
    generating an injection signal at a signal generator;
    applying the transmitted signal and injection signal to a loopback module external to said mobile communications device;
    mixing the transmitted and injection signals in the loopback module to produce a loopback signal;
    applying the loopback signal to the antenna of the mobile communications device;
    determining an offset at the mobile communications device based on the loopback signal.

23. The method of claim 22 wherein determining an offset value includes measuring a characteristic of the loopback signal and calculating the difference between the measured value and an expected value of said characteristic to determine the offset.

24. The method of claim 22 wherein determining an offset comprises determining a power offset.

25. The method of claim 24 wherein determining a power offset comprises calculating the difference between the power of the loopback signal and the expected transmit power of the mobile communication device.

* * * * *